United States Patent [19]
Brumm

[11] 3,730,214

[45] May 1, 1973

[54] ROTARY VALVE PRESSURE REGULATING SYSTEM

[75] Inventor: Richard S. Brumm, Orinda, Calif.

[73] Assignee: Walworth Company, Bala Cynwyd, Pa.

[22] Filed: Sept. 24, 1971

[21] Appl. No.: 183,373

[52] U.S. Cl. .....................137/487, 137/488, 251/58
[51] Int. Cl...............................................F16k 31/12
[58] Field of Search.....................137/488, 485, 487, 137/492, 492.5; 251/58

[56] References Cited

UNITED STATES PATENTS

| | | | |
|---|---|---|---|
| 2,082,940 | 6/1937 | Brisbane et al. | 137/488 |
| 2,111,837 | 3/1938 | Brisbane | 137/487 |
| 2,290,527 | 7/1942 | Bergtholdt, Jr. | 251/58 |
| 2,296,568 | 9/1942 | Peacock | 137/488 |

*Primary Examiner*—Henry T. Klinksiek
*Assistant Examiner*—Robert J. Miller
*Attorney*—Melvin R. Stidham

[57] ABSTRACT

A pressure reducing regulating system including a rotatable control valve operated by a hydraulic cylinder. An infinite positioning four-way valve selectively connects opposite sides of the cylinder to a fluid source and is operated by a pressure-responsive member. The fluid pressure being controlled biases the pressure-responsive member against a fixed force, whereby the four-way valve is moved an amount proportionate to the extent to which the controlled pressure deviates from a predetermined level. The fixed force biasing the pressure-responsive member may be a fluid at a predetermined pressure, augmented by a spring force.

3 Claims, 2 Drawing Figures

Patented May 1, 1973  3,730,214

INVENTOR
RICHARD S. BRUMM
BY Melvin R. Seidman
ATTORNEY

Patented May 1, 1973
3,730,214
2 Sheets-Sheet 2
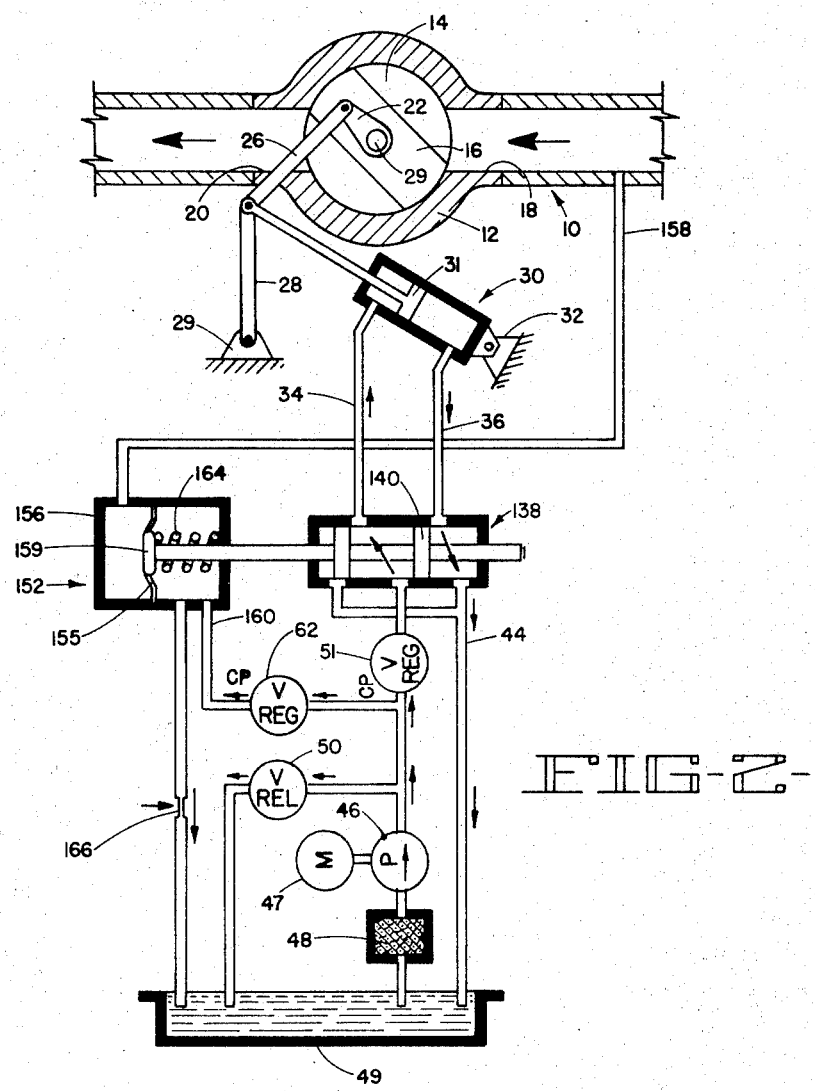
FIG-2-
INVENTOR
RICHARD S. BRUMM
BY *Melvin R. Stidham*
ATTORNEY

ROTARY VALVE PRESSURE REGULATING SYSTEM

BACKGROUND OF THE INVENTION

This invention relates to a pressure control system, and, more particularly, to a rotary control valve adapted to function as a pressure reducing valve in a pipeline.

Pump control valves are commonly employed in pipeline installations in order to maintain predetermined fluid conditions. For example, they function as pressure reducers; they modulate the rate of flow; and, in addition, they have a special function during initial operation of the pump to maintain a back pressure in the line and prevent cavitation. In order to accomplish this, known rotary control valves require a sophisticated array of detecting and control devices. Where the rotary control valve is employed solely for the purpose of regulating fluid pressure, it is desirable to eliminate the need for such costly detecting and control devices.

For pure pressure regulation, it has become conventional practice to employ poppet type valves which operate reciprocally in response to movement of a pressure-responsive member. However, even when open, the poppet generally remains in the flow stream and greatly restricts flow through the valve. Some rotary valves, such as ball and plug valves, generally have greater flow capacity and produce negligible resistance to flow when wide open. Accordingly, such valves are deemed desirable for pressure regulation as well as for conventional valve installations.

OBJECTS OF THE INVENTION

It is an object of this invention to provide a rotary pressure control valve operated by relatively simple devices.

It is a further object of this invention to provide a rotary pressure control valve which may be produced economically.

It is a further object of this invention to provide a high flow capacity rotary pressure valve capable of controlling pressure with relatively simple auxiliary devices.

Other objects and advantages of this invention will become apparent from the description to follow, particularly when read in conjunction with the accompanying drawings.

BRIEF SUMMARY OF THE INVENTION

In carrying out this invention, there is provided a rotary control valve, preferably of the ball valve type, which is operated by a hydraulic cylinder. An infinite positioning four-way valve delivers pressure fluid to the cylinder in proportion to the extent to which the valve spool is moved. Operating the valve spool is a pressure-responsive member which is biased by a constant force to hold the valve spool in the position which would maintain the set position of the rotary control valve. However, if the controlled pressure deviates from the predetermined level, the constant force overcomes it (or is overcome) to open the spool valve and move the spool valve in a direction which will restore the desired pressure. If a minimum level of downstream pressure is being controlled, the spool valve will move to open the control valve an amount in proportion to the pressure deficiency and it will move to close the control valve in the event of excessive pressure. Similarly, if a maximum back pressure is being controlled, the spool valve will move to open the control valve when the desired level is exceeded an amount proportionate to the pressure excess and it will hold the valve closed if the back pressure is too low.

DRAWINGS

In the drawings:

FIGS. 1 and 2 are diagrams of fluid pressure control systems embodying features of this invention.

DESCRIPTION OF THE PREFERRED EMBODIMENTS

The Embodiment of FIG. 1

Figure 1:
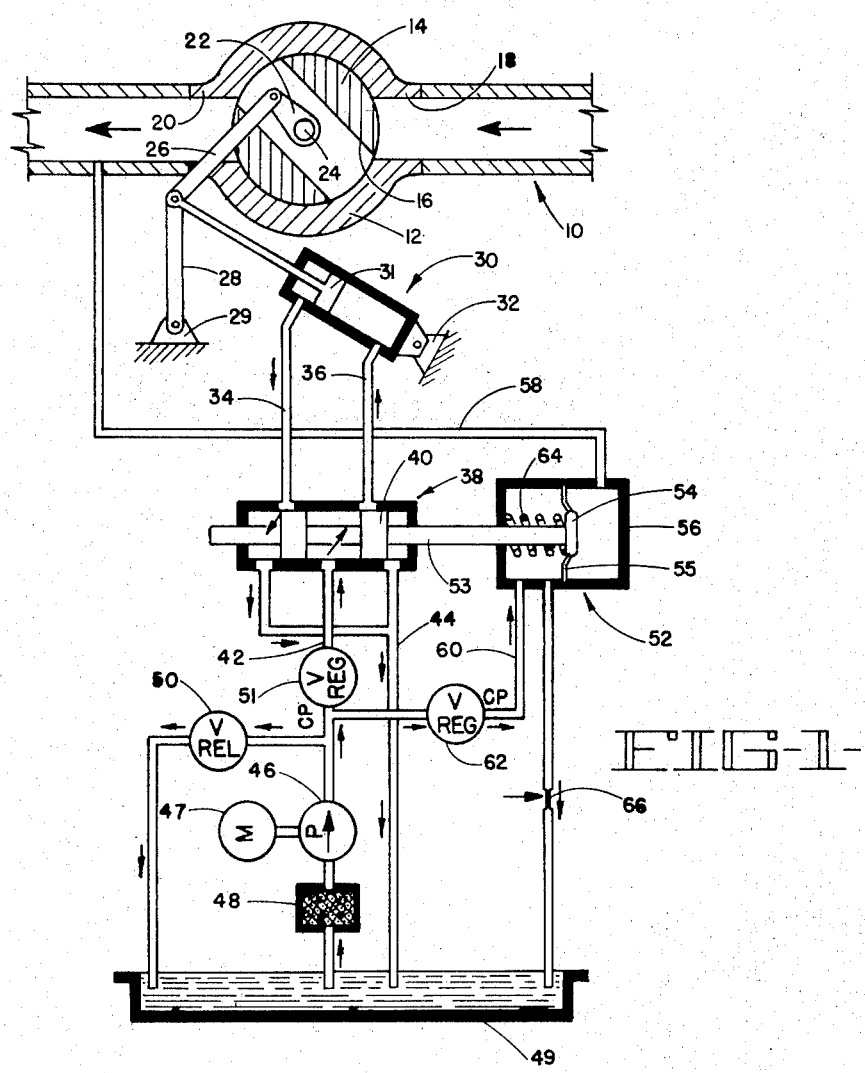

Referring now more particularly to FIG. 1, there is shown a pipeline 10 in which is installed a rotary control valve 12 of the ball or plug type. Rotatably mounted in the valve body 12 is a cylindrical or spherical plug 14 with a flow passageway 16 therethrough which in open position is aligned with inlet and outlet flow passages 18 and 20 in the valve body 12. Hence, in wide open position, the plug flow passage 16 is a continuation of the body flow passage 18 and there is negligible pressure drop across the valve in that position. An arm 22 carried on the valve stem 24 may be pivoted to position the plug in closed position or in any desired increment of open position from throttled flow to full flow.

A toggle linkage 26, 28 is pivotably connected between the operating arm 22 and a fixed base 29, and is operated by a pressure-responsive actuator or prime mover, such as a hydraulic cylinder 30 with piston 31, the cylinder being pivotably mounted on a fixed base 32. As shown, the valve plug 14 is turned clockwise and counter-clockwise in response, respectively, to extension and contraction of the toggle linkage. The arrangement is such that the increment of rotation of the valve plug 14 for a given increment of stroke of the piston 33 becomes smaller near the closed position of the valve plug 14 to enable finer throttling control.

A pair of flow ducts 34 and 36 opening into opposite ends of the cylinder 30 are connected to an infinite positioning four-way valve 38 with a control spool 40 providing selective communication with pressure and return lines 42 and 44. A pump 46 driven by a motor 47 pressurizes the line 42 through a filter 48, and the line 44 returns fluid to the sump 49. A relief valve 50 is provided to prevent over-pressurization of the line 42 and a back pressure regulator 51 is provided to maintain a desired pressure level. The infinite positioning four-way valve 38 allows flow through the ducts 34 and 36 substantially in proportion to the amount of movement of the control spool 40. Thus, with the spool partially deflected to the right, as shown in FIG. 1, there is a slow, throttled flow of pressure control fluid through the duct 36 and returned through the duct 34 to produce a slow stroke of the piston 30 to the left in FIG. 1, for a slow counter-clockwise rotation of the plug 14 toward open position. In the full left open position shown in FIG. 2, the pump 46 delivers full flow through duct 34 for rapid clockwise operation of the valve plug 14 toward closed position. In the closed position of the valve spool 40, the position of the cylinder piston 31 and, hence, the valve plug 14, is maintained.

Movements of the four-way valve plug 40 are effected by a positioner 52 including a stem 53 connected to the valve spool 40. The stem 53 is, in turn, connected to a diaphragm plate 54 on which is carried a diaphragm 55 sealed across a pressure vessel 56. A sensing duct 58 exposes one side of the diaphragm 55 to the pressure in the zone of the pipeline 10 over which pressure regulation is to be effected. A pilot or loading duct 60, which may be connected to the pressure line 42 maintains a pressure vessel under a fixed control pressure through a conventional pressure reducing regulator 62 whereby the control pressure acts against the diaphragm 55 in opposition to the controlled pressure. In addition, the control pressure in duct 60 may be augmented by a fixed biasing means, such as a compression spring 64. The control fluid is returned to the sump 49 through an orifice 66.

In the system of FIG. 1, a minimum level of downstream pressure is controlled, and in operation, if the downstream pressure in sensing duct 58 drops below the desired pressure level, the force of the spring 64 and the control pressure from pilot duct 60 will overcome it and move the spool 40 to the right, as shown in FIG. 1. This pressurizes the line 36 to force the piston 31 to the left, moving the plug 14 in a counter-clockwise direction toward closed position. The rate and amount of plug rotation is dependent upon the extent to which the controlled pressure is exceeded by the pilot force on the diaphragm 55, i.e., the amount of movement of the valve spool 40.

The Embodiment of FIG. 2

Referring now to FIG. 2, there is shown another embodiment of this invention wherein a system is adapted for control of back pressure. Structural components corresponding to those in FIG. 1, though modified, are shown by the same reference numerals preceded by the numeral 1. In this embodiment, a sensor duct 158 brings a positioner 152 in communication with the upstream pipeline 10, in the event of excessive back pressure, the upstream pressure acting against the diaphragm 155 forces the diaphragm to the right against the spring 164 and the pilot pressure to move the valve spool 140 to the right with it. This pressurizes the duct 36 and relieves the duct 34 whereby the piston 31 is driven to the left to contract the toggle linkage 26, 28 and turn the ball plug in a counter-clockwise direction toward open position, thus relieving upstream pressure. In the condition shown in FIG. 2, the upstream pressure has fallen below the desired level whereby the pilot pressure against the diaphragm 55 overcomes the upstream pressure, forcing the valve spool 140 toward the left and pressurizing line 24. This drives the piston 31 toward the right, extending the toggle linkage 26, 28 to rotate the ball 14 in a clockwise direction toward closed position until back pressure is again built up to the desired level.

While this invention has been described in conjunction with preferred embodiments thereof, it is obvious that modifications and changes therein may be suggested to those skilled in the art without departing from the spirit and scope of this invention as defined by the following claims.

What is claimed is:

1. A fluid pressure control system for a pipeline comprising:
    a rotatable control valve,
    a pressure responsive prime mover connected to rotate said control valve,
    an infinite positioning four-way valve,
    first and second ducts connected between one side of said four-way valve and opposite sides of said prime mover to move said prime mover and pivot said arm in opposite directions, respectively, toward full open and fully closed positions of said control valve,
    operating pressure and return lines connected to the other side of said four-way valve, and
    a positioner comprising:
    a fluid chamber,
    a reactive pressure-responsive member across said chamber in fluid tight relationship,
    means connecting said pressure-responsive member to said four-way valve so that movement of said pressure-responsive member in one direction will progressively open said pressure line to said first duct and in the other direction will progressively open said pressure line to said second duct,
    a fixed force biasing means comprising a pilot duct line in communication with said operating pressure line, connected to said chamber on one side of said pressure-responsive member, and
    a duct opening into said fluid chamber on the other side of said pressure-responsive member and adapted to be connected into the pipeline on one side of said rotatable control valve.

2. The fluid pressure control system defined by claim 1 including:
    a pressure-reducing regulating valve in said pilot duct.

3. The fluid pressure control system defined by claim 2 including:
    a biasing spring on said one side of the pressure-responsive member.

* * * * *